(12) United States Patent
Hwang et al.

(10) Patent No.: US 7,190,691 B2
(45) Date of Patent: Mar. 13, 2007

(54) METHOD OF CONTROLLING TIMING FOR UPLINK SYNCHRONOUS TRANSMISSION SCHEME

(75) Inventors: Seung Hoon Hwang, Seoul (KR); Bong Hoe Kim, Kyounggi-do (KR); Sung Lark Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 937 days.

(21) Appl. No.: 10/078,674

(22) Filed: Feb. 21, 2002

(65) Prior Publication Data

US 2002/0114314 A1    Aug. 22, 2002

(30) Foreign Application Priority Data

Feb. 22, 2001    (KR) .................................. 2001-8923

(51) Int. Cl.
*H04J 3/06* (2006.01)
*H04Q 7/20* (2006.01)

(52) U.S. Cl. ............ 370/350; 370/512; 370/514; 370/515; 370/503; 370/504; 455/522

(58) Field of Classification Search ............... 370/350, 370/503, 507–515
See application file for complete search history.

(56) References Cited

U.S. PATENT DOCUMENTS

| | | | | |
|---|---|---|---|---|
| 5,295,153 | A * | 3/1994 | Gudmundson | 370/335 |
| 5,341,397 | A * | 8/1994 | Gudmundson | 370/335 |
| 5,828,659 | A * | 10/1998 | Teder et al. | 370/328 |
| 6,657,988 | B2 * | 12/2003 | Toskala et al. | 370/350 |
| 6,680,928 | B1 * | 1/2004 | Dent | 370/342 |
| 6,963,540 | B2 * | 11/2005 | Choi et al. | 370/252 |
| 2001/0046220 | A1 * | 11/2001 | Koo et al. | 370/335 |
| 2002/0150065 | A1 * | 10/2002 | Ponnekanti | 370/334 |

FOREIGN PATENT DOCUMENTS

WO    WO 00/74261 A1    12/2000

OTHER PUBLICATIONS

SK Telecom and Nokia; "Study Report for Uplink Synchronous Transmission Scheme," 3G TR 25.USTS V0.1.0, Jan. 2001, pp. 1-25 (XP-002197286).
Office Action issued by Patent Office of the People's Republic of China dated May 13, 2005.

\* cited by examiner

*Primary Examiner*—Ricky Q. Ngo
*Assistant Examiner*—Venkatesh Haliyur
(74) *Attorney, Agent, or Firm*—Ked & Associates, LLP

(57) ABSTRACT

A method of controlling timing for an uplink synchronous transmission scheme is disclosed, including combining time alignment bit (TAB) information transmitted received during a predetermined period, determining a timing renewal value based on the combination, and controlling the transmission timing according to the timing renewal value. Thus, the TAB information transmitted by a base station may be used to synchronize the uplink transmissions of mobile communication devices.

25 Claims, 3 Drawing Sheets

METHOD OF CONTROLLING TIMING FOR UPLINK SYNCHRONOUS TRANSMISSION SCHEME

BACKGROUND OF THE INVENTION

1. Field of the Invention

The present invention relates to a mobile communication system and, more particularly, to a method of controlling the timing for an uplink synchronous transmission scheme.

2. Background of the Related Art

The uplink synchronous transmission scheme (USTS) is considered an additional technology in the 3rd Generation Partner Project (3GPP). USTS eliminates intra-cell interference by transmitting data, having the same scrambling codes and different orthogonal codes, from user equipment (UE) (i.e., mobile station) to a base station (Node B). The data transmitted by the UEs are received at the same time through the control of the base station. That is, the base station transmits each UE the time alignment bit (TAB) information to align the data arrival time and each UE controls its transmit timing based on the TAB information.

The timing control for USTS goes through an initial synchronization and a tracking process. A brief timing synchronization is obtained from the initial synchronization and the timing obtained from the initial synchronization is maintained in the tracking process. Generally, the initial synchronization is performed during a call set-up process, but sometimes it is omitted and the tracking process is performed. In the later case, the initial synchronization is performed by exchanging other control information, instead of the USTS TAB information, in which the acceptable range of the synchronization is about ±1.5 chip time.

The tracking process controls the timing by a closed loop means similar to that of a Transmit Power Control (TPC) system. That is, the base station transmits the TAB information every 20 ms to the available UEs. The base station sets the TAB information to "0" if the received signal timing is fast and to "1" if the received signal timing is slow. For a frame having 15 slots, the TAB information is included in the 15th slot of every other frame. More particularly, the TAB information is included in the TPC field of the 15th slot. The UE adjusts the timing by a predetermined time unit, which is determined by combining 10 hard decision values of "0" or "1" based on the TAB information. Here, the acceptable range of the synchronization is about ±⅛ chip time, if the tracking process is performed using the TAB information. Also, the timing control interworks with the Dedicated Channel (DCH).

FIG. 1 illustrates a frame structure for a related downlink dedicated channel. The downlink dedicated channel consists of a plurality of radio frames, where a period $T_f$ of one frame is 10 ms. One frame is made of 15 slots (Slot#0~Slot#14). Each slot time ($T_{slot}$) has 2,560 chips and a total number of bits given by $10 \times 2^k$ bits (k=0,1 ... 7). The slot includes an alternating sequence of a Dedicated Physical Data Channel (DPDCH) and a Dedicated Physical Control Channel (DPCCH). The first DPDCH includes the data1 of $N_{data1}$ bits, and the first DPCCH includes TPC control information of $N_{TPC}$ bits and TFCI control information of $N_{TPCI}$ bits. The second DPDCH includes the data2 of $N_{data2}$ bits, and the second DPCCH includes pilot information of $N_{pilot}$ bits.

The TFCI control information contains the channel information that is currently being transmitted. For example, the TFCI control information may identify the amount of data being transmitted, a coding method, and so on.

The TPC control information originally includes the transmission power control (TPC), but the TAB information may be included in the TPC control information when using the USTS of the present invention. That is, the TPC control information and the TAB information are alternatively included into the TPC field, through the dedicated channel, in the case of the USTS.

A timing renewal period of controlling the timing, based on the TAB information for USTS, is amended from 20 ms to 200 ms. Accordingly, the base station transmits ten independent pieces of TAB information, during a 200 ms period, in a manner similar to transmitting one piece of TAB information to the UE during a 20 ms period, as described above. The UE receives the ten pieces of TAB information transmitted from the base station, during the timing renewal period, and determines the timing using this information and adjusts its timing accordingly. This process can be well understood by one of ordinary skill in the art, with reference to the 3GPP Specification.

The continuous transmission of the independent TAB information, during the 200 ms period, impacts the TPC performance due to a puncturing operation, since the TPC bits are reduced. Also, a great deal of time is consumed since the UE combines ten pieces of TAB information to make a timing decision, thereby delaying and decreasing the frequency of the timing adjustments.

Also, the transmission of the independent TAB information itself causes a problem of reliability of the TAB information. The problem will be more serious in a soft hangover area. Accordingly, the data could not be well detected since the USTS gain could not be normally maintained, because of a failure to maintain the timing synchronization of the radio frame.

Further, a method of combining the TAB information is not considered in the related art USTS.

Furthermore, even if the base station transmits the TAB information several times, it does not have a large impact on the decision generated every 200 ms, since the UE performs a timing update based on the TAB information in units of ten.

Meanwhile, if the UE is located in a soft handover area, the TAB information is transmitted from a base station that maintains the USTS. Accordingly, the UE can receive the TAB information at a lower power than a sufficient reference power. As a result, the quality of the TAB information for the USTS cannot be ensured, thereby requiring a suitable solution of combining the TAB information to solve the foregoing problems.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a method of controlling the timing for an uplink synchronous transmission scheme, using a plurality of TAB information received in a UE.

A further object of the present invention is to provide a method of combining a plurality of TAB information, during a predetermined time, to calculate the timing renewal value used to control the timing in a UE.

To achieve the above objects in whole or in part, there is provided a method of controlling timing for an uplink synchronous transmission scheme in a UE. The method includes combining a plurality of time alignment bit (TAB) information transmitted from a base station into a predetermined time unit; determining a timing renewal value based on the combination; and controlling the timing according to the timing renewal value.

Pieces of the TAB information can be selected on the basis of a predetermined threshold value, prior to combining the TAB information.

A weighting value is assigned to the plurality of TAB information prior to combining it. The weighting value is assigned in accordance with the order the TAB information is received. The weighting values can be assigned according to either a linear or a non-linear relationship.

The plurality of TAB information is decoded in a UE prior to combining the TAB information, which are coded by bi-orthogonal codes in the base station. The TAB information have repetition of the same bi-orthogonal code or partly the same bi-orthogonal code.

Also, the timing renewal value is determined applying a hard or a soft decision method.

According to an another preferred embodiment of the present invention, there is provided a method of combining a plurality of TAB information of a dedicated channel for the uplink synchronous transmission scheme using the TAB information whose value is greater than a predetermined threshold value.

Also, according to another preferred embodiment of the present invention, there is provided a method of combining a plurality of TAB information of a dedicated channel for the uplink synchronous transmission scheme using a weighting value that is granted in accordance with the order the TAB information is received. The weighting value is assigned according to either a linear or a non-linear relationship.

Further, according to another preferred embodiment of the present invention, there is provided a method of combining a plurality of TAB information of a dedicated channel for the uplink synchronous transmission scheme using a decoded result based on the plurality of TAB information, which is encoded by bi-orthogonal codes and transmitted from a base station.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

According to the related art, the time alignment bit (TAB) information is transmitted from a base station every 20 ms. A user equipment (UE) calculates a timing renewal value by combining a plurality of received TAB information and then performs a timing update operation every 200 ms (i.e., using ten units of TAB information).

The present invention provides a method for combining the ten units of TAB information and calculating the timing renewal value, when the timing update operation is performed using the ten units of TAB information. Hereinafter, the overlapped description will be omitted in the specification of the present invention.

Figure 1:
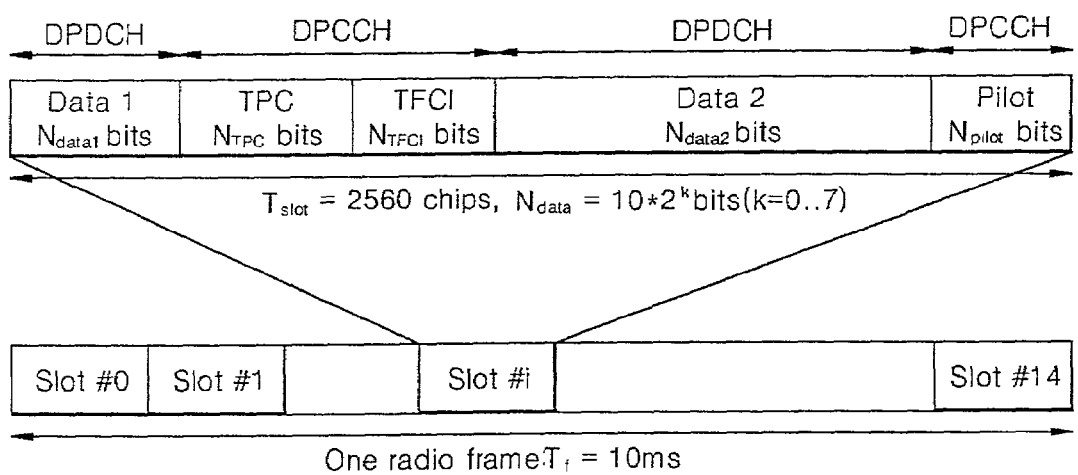
FIG. 1 illustrates a frame structure for a related art downlink dedicated channel.
Figure 2:
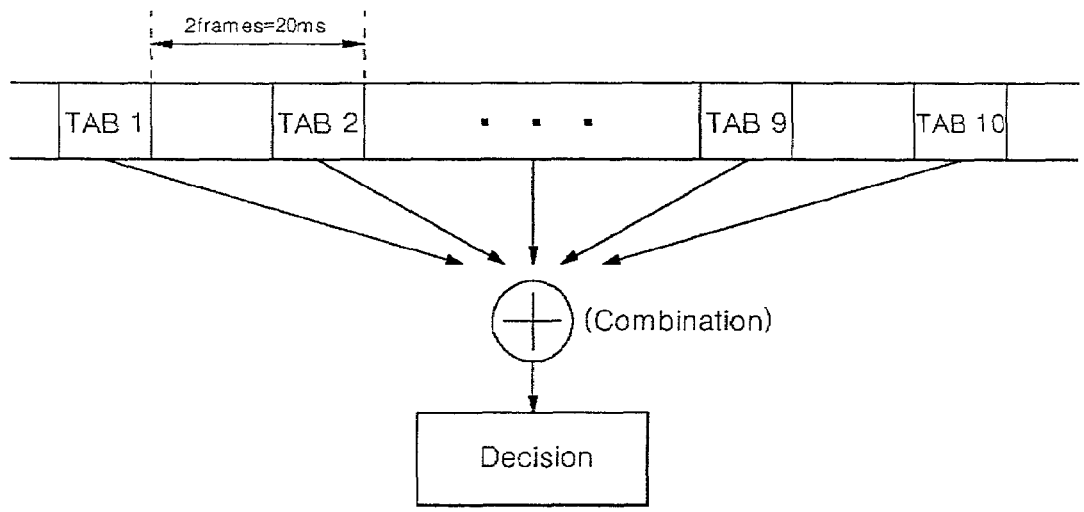
FIG. 2 illustrates a method of simply combining a plurality of TAB information at a UE, according to a preferred embodiment of the present invention.

FIG. 2 illustrates a method of combining the plurality of TAB information at the UE, according to the preferred embodiment of the present invention. The base station transmits the TAB information every 20 ms period. As described above, the UE can receive ten units of TAB information (TAB1~TAB10) within a timing renewal period, since the UE calculates the timing renewal value using the TAB information every 200 ms. The UE combines ten units of TAB information and then decides the timing renewal value calculated through the combination. Accordingly, the UE can adjust the timing of the transmitting data, according to the renewal value, by the uplink synchronous scheme.

That is, the base station compares the timing for the received signal from the UE with a desired timing. The base station sets the TAB information to "0" if the timing for the received signal is fast and to "1" if the timing for the received signal is slow. The base station transmits the TAB information to the UE by inserting it into a transmission power control (TPC) field of the 15th slot of every other frame.

The ten units of TAB information received during a 200 ms period by the UE are combined through a hard decision method or a soft decision method. If the hard decision method is used, the combination is achieved by a majority vote of the hard decision values. If the soft decision method is used, the combination is achieved by utilizing an average value of the combined TAB information.

The UE determines the timing based on the calculated value. For example, using hard decision method, the UE calculates a timing renewal value of "1", if 8 units of TAB information are "1" and 2 units are "0", among the total of ten units. The timing renewal value of "1" means that the timing is slow and that the subsequent timing should be advanced.

As another example, the soft decision method can be applied to the case where the TAB information received at the UE are "0.3", "0.5", "0.6", and "0.7", instead of just "0" or "1", according to the channel circumstance and other causes. That is, the UE determines the timing renewal value using the average value of the TAB information, when the received units of TAB information are real numbers instead of integers. Preferably the average value is averaged from ten units of the TAB information. Also, the timing renewal value can be determined by summing the TAB information that is larger than the average value. Additionally, the TAB information can be restricted to values of "0" or "1".

Figure 3:
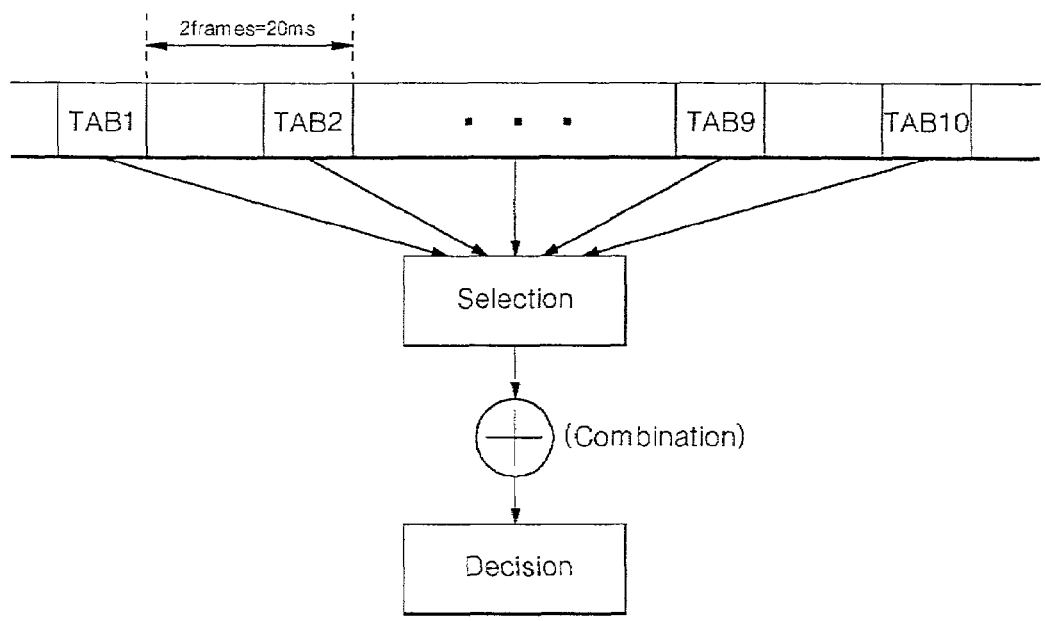
FIG. 3 illustrates a method of combining a plurality of TAB information after selecting a part of the TAB information at a UE, according to another preferred embodiment of the present invention.

FIG. 3 illustrates a method of combining a plurality TAB information after selecting a part of the TAB information at the UE, according to another preferred embodiment of the present invention. Referring to FIG. 3, the TAB transmission period is the same 200 ms period shown in FIG. 2. Combining the plurality of TAB information received from the UE can be performed selectively in the UE. That is, it is desirable that a threshold value be determined in advance at the UE. Then, the UE compares the plurality of TAB information with the threshold value and selects the TAB information that is greater than the threshold value. The UE can control the timing for the received signal using the timing renewal value calculated by combining one or more units of TAB information, selected as described above.

For example, suppose the threshold value is P0 and the bit value of a received unit of TAB information is P1. The P1 TAB information is selected for use in determining the timing renewal value only if P1>P0. Preferably, the threshold value P0 is established as a value between "0" to "1", since the units of TAB information have bit values of "0" or "1".

Figure 4:
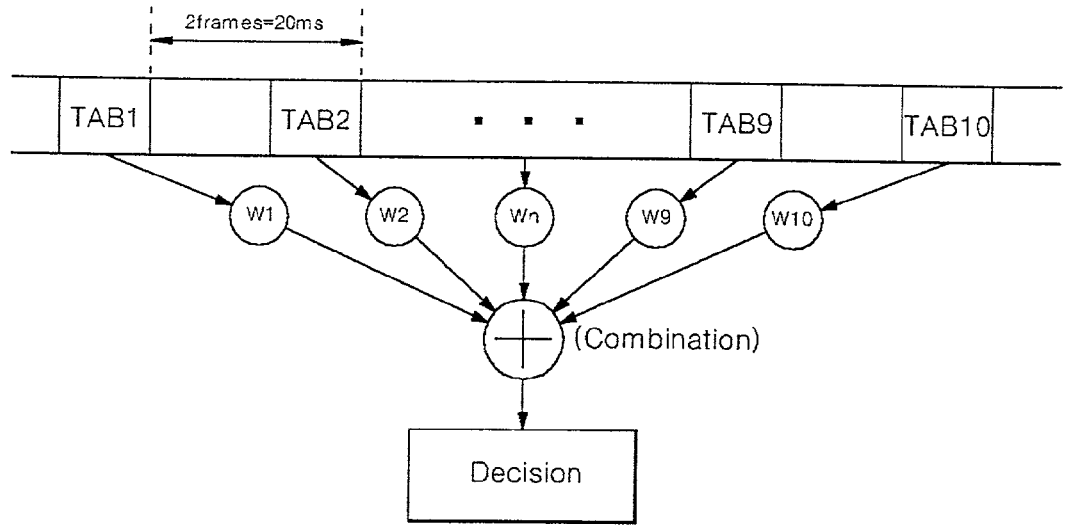
FIG. 4 illustrates a method of combining a plurality of TAB information by assigning weight to the TAB information, at a UE, according to another preferred embodiment of the present invention.

FIG. 4 illustrates a method of combining the plurality of TAB information by assigning a weighting value to the TAB information at the UE, according to another preferred embodiment of the present invention. Referring to FIG. 4, the TAB transmission period is the same 200 ms period shown in FIG. 2. The TAB information received in the UE is combined after assigning the weighting value to each unit of the TAB information. That is, the base station transmits ten units of TAB information to the UE during a 200 ms period. Then, the UE assigns a weighting value to each of the received units of TAB information according to their respective order of arrival at the UE.

Preferably, the weighting value is assigned according to the order in which the units of TAB information are received in the UE or according to an operator's decision. The plurality of TAB information units are differently applied when the timing renewal value is determined, because the weighting values are differently granted for the TAB information. Preferably, the TAB information units mostly influencing the timing renewal are the units received last in order. So, the weighting values can be intermittently or continuously increased for each subsequently received one of the multiple units of TAB information. The weighting value may be assigned according to a linear or a non-linear relationship.

For example, suppose that ten units of TAB information are transmitted to the UE and the TAB information units are numbered according to their respective order of receipt. In this case, the first one received is identified as the first TAB information unit, the next one as the second TAB information unit, and so on. The tenth TAB information unit is the last one. Further suppose that the weighting value is a value between "0" and "1".

If a linear weighting scheme is applied, a weighting value of 0.1 can be assigned to the first unit of TAB information, a weighting value of 0.2 may be assigned to the second unit of TAB information, and so on. And, a weighting value of 1 can be assigned to the tenth unit of TAB information. Thereafter, the timing renewal value can be calculated by summing the weighted TAB information.

However, if a non-linear weighting scheme is applied, the values 1, 0.2, 0.2, 0.3, 0.3, 0.5, 0.5, 0.8, 0.8, and 1 may be assigned to the first through tenth units of TAB information, respectively. Preferably, the plurality of TAB information units have values of "0" or "1".

Figure 5:
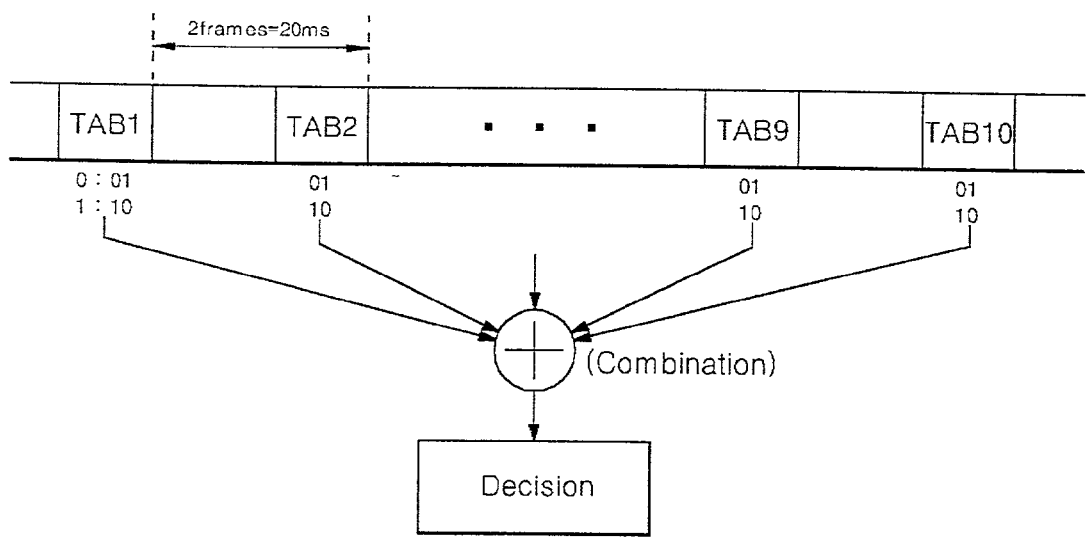
FIG. 5 illustrates a method of combining a plurality of TAB information after decoding the TAB information at a UE, according to another preferred embodiment of the present invention.

FIG. 5 illustrates a method of combining a plurality of TAB information after decoding the TAB information at the UE, according to another preferred embodiment of the present invention. The TAB transmission period is the same 200 ms period as shown in FIG. 2. The plurality of TAB information received in the UE are combined after decoding the TAB information. The TAB information are encoded by bi-orthogonal codes at the base station. The bi-orthogonal code uses 2 bits to efficiently transmit the TAB information values of "0" or "1". For example, a "0" value can be encoded by the bi-orthogonal code as "01", while a "1" value can be encoded by the bi-orthogonal code as "10". Of course, the bi-orthogonal codes can be expressed by "00" or "11" in a certain case.

The base station encodes ten units of TAB information using the same bi-orthogonal codes, or bi-orthogonal codes that are partially equal to each other, prior to transmitting the TAB information units to the UE. Here, by the use of the same bi-orthogonal code repeatedly, the influence of the TAB inclusion on the TPC function can be reduced, when the timing variation of uplink signals is small. Wherein, the influence would occur, if the independent TABs are continuously transmitted to the UE.

The UE decodes the plurality of TAB information units encoded by the bi-orthogonal code and then calculates the timing renewal value based on their combination.

Also, in the method of combining a plurality TAB information units to determine the timing renewal value, it is noted that the methods described above and a combination of each method can be applied in the case that the UE is located in or out of a soft handover area.

As described above, the present invention suggests several methods of combining the TAB information to decide the timing renewal value maintaining the USTS.

The plurality of TAB information units received in the UE during the predetermined time are combined; combined after selecting the TAB information units that are over the threshold value, to improve the quality for the received signal; combined after assigning the weighting value for the TAB information; or combined after decoding the plurality of TAB information units encoded by the bi-orthogonal code. Also, according to the present invention, a combination of the above methods can be used in various forms.

As described above, according to the method of combining a plurality of TAB information units of a dedicated channel for the uplink synchronous transmission scheme, the quality of the received signal for the USTS is increased, thereby improving the USTS function by performing the timing control after deciding the timing renewal value based on the result of combining the plurality of TAB information, according to the various preferred embodiments of the present invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of controlling transmission timing, comprising:

receiving time alignment bit (TAB) information in a plurality of frames during a predetermined period;

assigning a weighting value to each of multiple units of the TAB information received, said weighting value being assigned in accordance with the order in which the corresponding unit of TAB information is received;

combining the weighted units of TAB information using the weighting values;

determining a timing renewal value based on the combination; and controlling the transmission timing according to the timing renewal value.

2. The method of claim 1, further comprising selecting multiple units of the TAB information, on the basis of a predetermined threshold value, prior to assigning the weighting value and combining the selected weighted units of TAB information.

3. The method of claim 1, wherein the timing renewal value is determined by comparing a total value of the combined TAB information with a predetermined threshold value.

4. The method of claim 1, wherein the weighting values are assigned according to a non-linear relationship.

5. The method of claim 1, wherein the weighting values are assigned according to a linear relationship.

6. The method of claim 1, further comprising decoding the received TAB information from a bi-orthogonal code, prior to combining the TAB information.

7. The method of claim 6, wherein the received TAB information are encoded by a bi-orthogonal code.

8. The method of claim 6, wherein the received TAB information are encoded by a time variant bi-orthogonal code.

9. A method of controlling timing, comprising:

checking the timing of a signal transmitted from a user equipment (UE), the timing of the signal being based on a combination of weighted units of time alignment bit (TAB) information;

determining a timing control command value according to a result of the timing check;

converting the timing control command value into a plurality of time alignment bit (TAB) information to control the timing; and transmitting the plurality of TAB information to the UE.

10. The method of claim 9, wherein the timing control command value is converted into repeated TAB information.

11. The method of claim 9, wherein each bit of the converted TAB information is encoded by two bits.

12. A method of controlling a transmission time of uplink signals, comprising:

receiving a plurality of time alignment bits transmitted from a base station during a predetermined period;

assigning a weighting value to each of multiple units of the plurality of received time alignment bits in accordance with the corresponding order of receipt determining a deviation of the transmission time by combining the weighted units of the plurality of received time alignment bits, the combining being performed by adding the weighted units of the plurality of received time alignment bits; and controlling the transmission time of the uplink signals in accordance with the determined deviation.

13. The method of claim 12, wherein each of the plurality of time alignment bits provides complete information of the deviation of the transmission time for a specific time.

14. The method of claim 12, wherein no fewer than two of the plurality of time alignment bits provide complete information of the deviation of the transmission time for a specific time.

15. The method of claim 12, wherein the weighting values are assigned according to a non-linear relationship.

16. The method of claim 12, wherein the weighting values are assigned according to a linear relationship.

17. The method of claim 12, wherein later received time alignment bits are more heavily weighted.

18. A method of controlling a transmission time of uplink signals in a base station of a wireless communication system using an uplink synchronous transmission scheme, comprising:

setting a base time for receiving the uplink signals from a plurality of mobile stations;

receiving a particular uplink signal from one of the plurality of mobile stations, the particular uplink signal being based on a combination of weighted units of time alignment bit CRAB) information;

determining a deviation of the transmission time from the base time by comparing the particular uplink signal's transmission time with the base time; and transmitting a plurality of time alignment bits of a code sequence, from a set of bi-orthogonal code sequences, through a downlink channel to the plurality of mobile stations.

19. The method of claim 18, wherein the code sequence is repeatedly transmitted through the downlink channel.

20. The method of claim 19, wherein the bi-orthogonal code sequence is composed of two bits.

21. The method of claim 9, wherein the timing control command value is determined by various time units.

22. The method of claim 9, wherein the timing control command value is converted into a plurality of independent TAB information.

23. The method of claim 6, wherein the received TAB information are decoded from the bi-orthogonal code before between two and ten separate pieces of the TAB information, out of a total of ten pieces of the received TAB information, are combined.

24. A method of controlling transmission timing, comprising:

combining time alignment bit (TAB) information received in a plurality of frames during a predetermined period;

determining a timing renewal value based on the combination; and controlling the transmission timing according to the timing renewal value, wherein the combination of the TAB information is performed using at least one of a selected values among the received TAB information on the basis of a predetermined threshold value, and a received TAB information to which a weight is assigned.

25. The method of claim 24, wherein at least one of the selected values of multiple units of the TAB information is on the basis of a hard decision method based on a majority vote of hard decision TAB information or a soft decision method based on an average value of the received TAB information, and is performed prior to combining the selected units of TAB information.

* * * * *